US008285437B2

(12) United States Patent
Kubota et al.

(10) Patent No.: US 8,285,437 B2
(45) Date of Patent: Oct. 9, 2012

(54) MAINTENANCE TIME NOTIFICATION DEVICE

(75) Inventors: Masatoshi Kubota, Sakura (JP); Naoki Fukui, Utsunomiya (JP); Kazuyuki Endo, Oyama (JP)

(73) Assignee: Honda Motor Co., Ltd., Tokyo (JP)

( * ) Notice: Subject to any disclaimer, the term of this patent is extended or adjusted under 35 U.S.C. 154(b) by 310 days.

(21) Appl. No.: 12/663,656

(22) PCT Filed: Mar. 4, 2008

(86) PCT No.: PCT/JP2008/053818

§ 371 (c)(1), (2), (4) Date: Dec. 8, 2009

(87) PCT Pub. No.: WO2008/152836

PCT Pub. Date: Dec. 18, 2008

(65) Prior Publication Data

US 2010/0174443 A1 Jul. 8, 2010

(30) Foreign Application Priority Data

Jun. 15, 2007 (JP) ................................ 2007-158702

(51) Int. Cl.

*B60S 5/00* (2006.01)
*G07C 5/00* (2006.01)
*G06F 7/00* (2006.01)
*G07C 5/10* (2006.01)
*B60R 16/02* (2006.01)

(52) U.S. Cl. .................... 701/29.4; 701/29.1; 701/32.5; 701/33.6

(58) Field of Classification Search ................ 701/1, 29, 701/30, 33, 35; 340/425.5, 438, 457.4, 461
See application file for complete search history.

(56) References Cited

U.S. PATENT DOCUMENTS

| | | | | |
|---|---|---|---|---|
| 3,911,855 | A * | 10/1975 | Haven | 340/457.4 |
| 4,525,782 | A * | 6/1985 | Wohlfarth et al. | 701/99 |
| 4,551,703 | A * | 11/1985 | Bourauel et al. | 340/457.4 |
| 6,459,969 | B1 | 10/2002 | Bates et al. | |
| 2002/0080022 | A1* | 6/2002 | Edwards | 340/457 |
| 2005/0080525 | A1* | 4/2005 | Hoeflacher et al. | 701/29 |
| 2005/0216150 | A1 | 9/2005 | Binderberger | |
| 2007/0021884 | A1 | 1/2007 | Chen et al. | |

FOREIGN PATENT DOCUMENTS

| | | |
|---|---|---|
| DE | 10345883 | 5/2005 |
| DE | 102004003497 B3 * | 9/2005 |
| EP | 1118965 | 7/2001 |
| FR | 2888977 | 1/2007 |

(Continued)

*Primary Examiner* — Khoi Tran
*Assistant Examiner* — Dale Moyer
(74) *Attorney, Agent, or Firm* — Rankin, Hill & Clark LLP

(57) ABSTRACT

A maintenance time notification device includes a storing unit storing a threshold value of a usage time or a traveling distance for each of a plurality of vehicle parts; a measuring unit measuring the usage time and the traveling distance of a vehicle since the vehicle began to be used for each of the vehicle parts; a maintenance period determination unit determining a maintenance period of each of the vehicle parts by comparing the usage time and the traveling distance measured by the measuring unit, with the threshold value; and a reporting unit reporting to a passenger based on a determination result of the maintenance period determination unit.

5 Claims, 6 Drawing Sheets

FOREIGN PATENT DOCUMENTS

| | | | |
|---|---|---|---|
| GB | 2127554 | | 4/1984 |
| JP | 2002-140447 | | 5/2002 |
| JP | 2003-040090 | | 2/2003 |
| JP | 2005-004240 | | 1/2005 |
| JP | 2005-153682 | | 6/2005 |
| JP | 2006-021570 | | 1/2006 |
| JP | 2006-088751 | | 4/2006 |
| RU | 2252882 | C1 | 5/2005 |

* cited by examiner

MAINTENANCE TIME NOTIFICATION DEVICE

TECHNICAL FIELD

The present invention relates to a maintenance time notification device of a vehicle.

Priority is claimed on Japanese Patent Application No. 2007-158702, filed Jun. 15, 2007, the content of which is incorporated herein by reference.

BACKGROUND ART

Conventionally, a maintenance time notification device has been known which stores a predetermined and recommended maintenance time for each vehicle part to a memory, determines whether or not the recommended maintenance time for the vehicle part has been reached based on the time that has passed since the vehicle part began to be used or based on the traveling distance of the vehicle since the vehicle began to be used, and notifies this to a passenger when the recommended maintenance time has been reached (refer to, for example, Patent Document 1).

[Patent Document 1]

Japanese Unexamined Patent Application No. 2003-040090

DISCLOSURE OF THE INVENTION

Problems to be Solved by the Invention

However, according to the maintenance time notification device, for example, even though a vehicle is warehoused to a dealer and receives maintenance because a maintenance time for a vehicle part has been reached, a maintenance time for another vehicle part may be reached and reported several days after maintenance operations have been performed by the dealer. Therefore, there is a problem in that, the user ends up warehousing the vehicle to the dealer multiple times in a short period of time for maintenance operations, and the user therefore incurs increased costs.

Therefore, an object of the present invention is to provide a maintenance time notification device that can decrease the number of times that a vehicle is warehoused to a dealer for maintenance, and reduce the cost incurred by a user.

Means for Solving the Problems (1) A maintenance time notification device according to an aspect of the present invention includes a storing unit storing a threshold value of a usage time or a traveling distance for each of a plurality of vehicle parts; a measuring unit measuring the usage time and the traveling distance of a vehicle since the vehicle began to be used for each of the vehicle parts; a maintenance period determination unit determining a maintenance period of each of the vehicle parts by comparing the usage time and the traveling distance measured by the measuring unit, with the threshold value; and a reporting unit reporting to a passenger based on a determination result of the maintenance period determination unit, wherein the storing unit stores a first threshold value being one of the threshold value of the usage time and the traveling distance, the storing unit also storing a second threshold value being one of the threshold value which is set so that the usage time and the traveling distance required to reach the maintenance limit is longer than the first threshold value; the maintenance period determination unit determines whether or not there is a vehicle part with at least one of the usage time and the traveling distance that has reached the first threshold value, the maintenance period determination unit also determining whether or not there is a vehicle part with at least one of the usage time and the traveling distance that has reached the second threshold value; based on the determination result of the maintenance period determination unit, the reporting unit only reports the vehicle part that has reached the first threshold value to the passenger when there is only the vehicle part that has reached the first threshold value, and, when there is a vehicle part with the usage time or the traveling distance that has reached the first threshold value in addition to a vehicle part with the usage time or the traveling distance that has only reached the second threshold value, the reporting unit reports both the vehicle part that has reached the first threshold value along with the vehicle part that has only reached the second threshold value to the passenger.

(2) In addition, the above maintenance time notification device may be configured as follows: the storing unit stores the first threshold value and the second threshold value which are common to all of the vehicle parts.

(3) In addition, the above maintenance time notification device may be configured as follows: when the maintenance period determination unit determines that there is no vehicle part with the usage time and the traveling distance that have reached the first threshold value, the reporting unit reports to the passenger, a vehicle part that is closest to a maintenance limit requiring an exchange, and the usage time and the travelling distance of this vehicle part.

(4) In addition, the above maintenance time notification device may be configured as follows: the maintenance period determination unit determines, from among the usage time and the traveling distance of each of the vehicle parts measured by the measuring unit, a usage time closest to the maintenance limit and a traveling distance closest to the maintenance limit, the maintenance period determination unit also performing a conversion by converting either one of the usage time closest to the maintenance limit and the traveling distance closest to the maintenance limit to an other unit, the maintenance period determination unit also performs a comparison of a converted value with an other value; when the comparison shows that the converted value has the usage time or the traveling distance that is closer to the maintenance limit compared to the other value, the reporting unit reports to the passenger, the other value before the conversion, and, when the other value has the usage time or the traveling distance that is closer to the maintenance limit compared to the converted value, the reporting unit reports the other value to the passenger.

(5) In addition, the above maintenance time notification device may be configured as follows: the reporting unit includes a displaying unit displaying a remaining usage time or a remaining traveling distance required to reach the maintenance period; and the displaying unit performs a renewal of a display of the remaining usage time or the remaining traveling distance when, a predetermined amount of time is determined to have passed since the renewal of the display was previously performed, or when the vehicle is determined to have traveled a travelling distance corresponding to the predetermined amount of time according to an estimated value of an annual traveling distance.

(6) In addition, the above maintenance time notification device may be configured as follows: the reporting unit includes a displaying unit displaying a plurality of figures; the storing unit storing a third threshold value which is set so that the usage time and the traveling distance required to reach the maintenance limit are shorter compared to the first threshold value; based on a measuring result of the measuring unit, the maintenance period determination unit determines whether or not the usage time and the traveling distance have reached the third threshold value; and when the maintenance period determination unit determines that the usage time and the traveling distance have reached the third threshold value, the displaying unit switches over a displaying condition of a certain figure among the plurality of figures, and reports to the passenger that there is a vehicle part with an impending maintenance limit.

(7) In addition, the above maintenance time notification device may be configured as follows: the storing unit stores the vehicle part as a maintenance item corresponding to each of the vehicle part; and the reporting unit includes a displaying unit displaying the maintenance item, the reporting unit reporting to the passenger by displaying the maintenance item to the displaying unit.

Effects of the Invention

According to the invention described above in (1), when a vehicle part which has reached a first threshold value for a usage time and a traveling distance is being reported, a vehicle part that has reached only a second threshold value set to a longer usage time and a longer traveling distance compared to the first threshold value is reported in addition to the vehicle part which has reached the first threshold value. As a result, the vehicle part that needs maintenance is reported in addition to the vehicle part that has a maintenance time that is quickly approaching. Therefore, it is possible to reduce the number of times that the vehicle is warehoused to the dealer for maintenance and thus decrease the cost incurred by the user.

In addition, it is possible to perform multiple maintenance operations in one incident in which the vehicle is warehoused. Consequently, it is possible for a maintenance personnel of the dealer to reduce the number of operations such as disassembling. Therefore, the burden of the maintenance personnel can also be reduced.

According to (2) as described above, it is possible to reduce the amount of information concerning the first threshold value and the second threshold value stored in the storing unit. Therefore, the capacity of the storing unit can be controlled.

According to (3) as described above, when neither the usage time nor the traveling distance measured by the measuring unit has reached the first threshold value of the usage time or the traveling distance, the vehicle part having the nearest maintenance period is constantly reported to the user in addition to the usage time and the traveling distance of this vehicle part. As a result, the user can be made constantly aware of the nearest maintenance period, leading to enhanced merchantability.

According to (4) as described above, either one of the minimum usage time or the minimum traveling distance for each vehicle part is converted to the unit of the other, and this converted value is compared with the other value. Thus, when the converted value is less than the other value, the former value before conversion can be reported. When the other value is less than the converted value, the other value can be reported. Therefore, based on the frequency with which the vehicle is used, it is possible to report to the user, the value of either the usage time of the vehicle part or the traveling distance of the vehicle, whichever is estimated to be closer to the maintenance period. As a result, it is possible to report appropriately based on the frequency with which the user uses the vehicle.

According to (5) as described above, for example, when the presumed value of the annual traveling distance of the vehicle is relatively small, the remaining usage time reaches the predetermined time first. When the presumed value of the annual traveling distance of the vehicle is relatively large, the remaining traveling distance reaches the traveling distance corresponding to the predetermined time first. Therefore, it is possible to prevent a decline in the reliability of the display concerning the maintenance time due to the display not being renewed frequently enough. It is also possible to prevent the contents of the display from flickering and becoming hard to look at due to the display being renewed too frequently. As a result, the merchantability can be improved. The user is also able to comprehend the contents of the display more easily.

According to (6) as described above, when the usage time or the traveling distance reaches the third threshold value, this can be informed to the driver by switching the display of the figures. As a result, it is possible to easily acknowledge by looking at the display of the figures that the maintenance time limit is impending.

According to (7) as described above, the user can comprehend the types of the vehicle parts based on the names of the maintenance items displayed on the displaying portion. Thus, the display can be made simpler compared to, for example, displaying all of the names of the vehicle parts. Therefore, it is possible to increase the freedom with which the display is shown by the displaying portion.

DESCRIPTION OF REFERENCE NUMERALS

10 EEPROM (memory portion)
7 timer (measurement portion)
8 odometer (measurement portion)
13 maintenance period computation portion (maintenance period determination portion)
2 multi-information display (reporting portion, displaying portion)
21 spanner mark (figure)
22 vehicle mark (FIG.
24 arrow mark (figure)

BEST MODE FOR CARRYING OUT THE INVENTION

Next, an embodiment of the present invention is described with reference to the figures.

Figure 1:
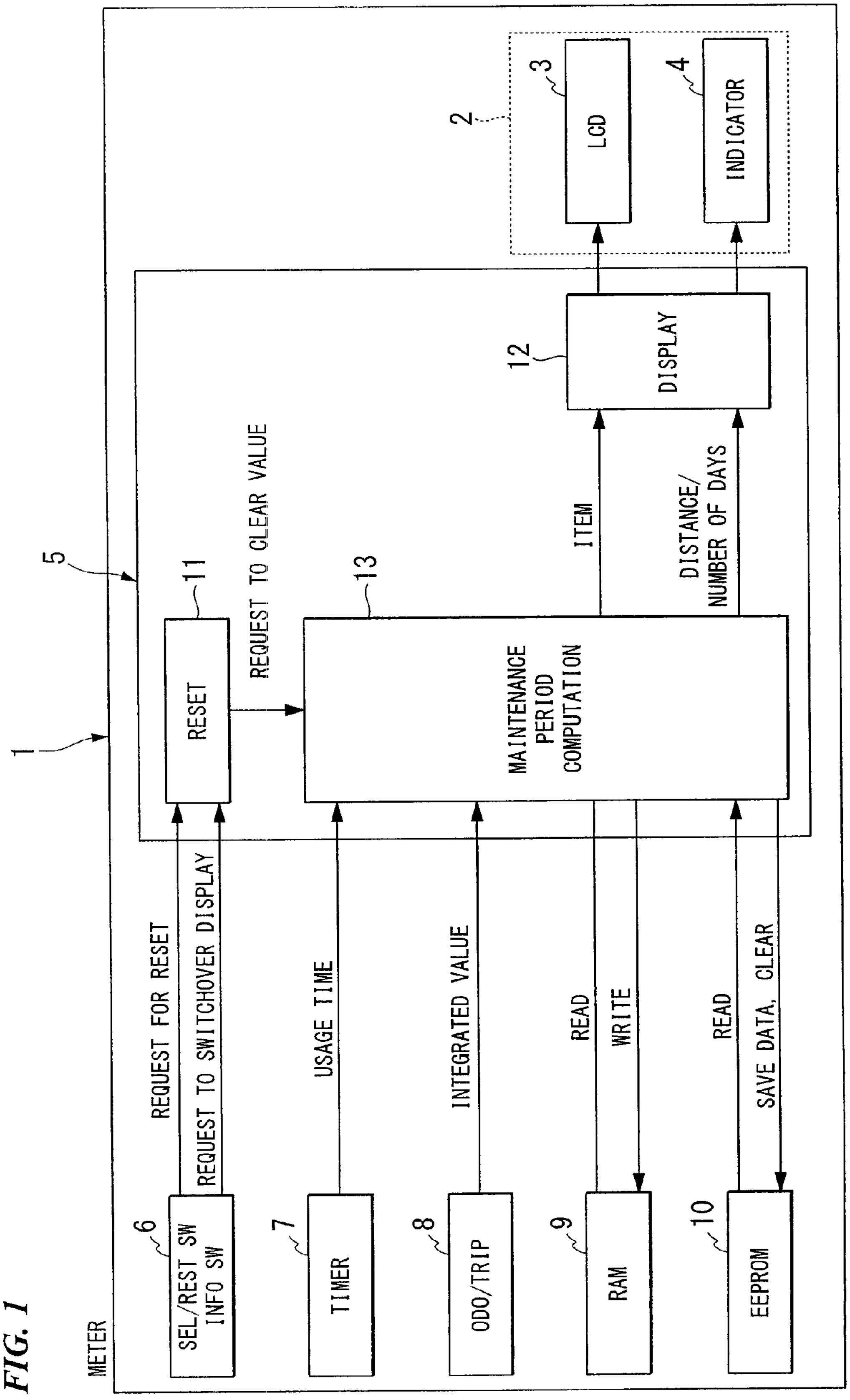
FIG. 1 is a block diagram of a meter according to an embodiment of the present invention.

FIG. 1 shows a skeleton framework of a meter 1 of a vehicle according to the present embodiment. This meter 1 is placed in front of a driver's seat or in a central position in the vehicle width direction, which can be seen easily by a driver sitting in the driver's seat. This meter 1 is equipped with gauges, not diagrammed, such as a vehicle velocity measurement equipment, an engine speed measuring equipment, a fuel meter, and a water temperature gauge. Aside from the above gauges, the meter 1 is equipped with a multi-information display 2 which can display various information. This multi-information display 2 includes a liquid crystal displaying unit 3 and an indicator 4. Based on a control command from a maintenance time notification device 5, the multi-information display 2 can display various maintenance information such as the maintenance time set for each of the vehicle parts. The meaning of the above term "maintenance" includes not only operations such as fluid exchange and exchanging vehicle parts, but also all of the operations such as adjusting the positions of vehicle parts and adjusting the wires. In addition, the term "maintenance time" refers to the period which is appropriate for performing the above maintenance.

The meter 1 includes, other than what was described above, a select/reset switch (SEL/RESET SW) 6, a timer 7, an odometer (ODO/TRIP) 8, a RAM (Random Access Memory) 9, and an EEPROM (Electrically Erasable Programmable ROM) 10.

The select/reset switch 6 includes a switch for the maintenance time notification device 5 to switch over the contents displayed on the multi-information display 2, and a switch for resetting various types of information for each of the vehicle parts after maintenance operations have been performed on the vehicle parts. The select/reset switch 6 is connected to a reset controlling unit 11 of the maintenance time notification device 5. When a user performs a certain resetting operation with the select/reset switch 6, a command for requesting the reset and a command for requesting a switchover of the display are made to the reset controlling unit 11. When a certain selecting operation is performed with the select/reset switch 6, it is possible to alter the contents displayed on the multi-information display 2 through the reset controlling unit 11 and a maintenance period computation portion 13, and, for example, switch over from a display of the maintenance information to a display of, for instance, the integrated distance, water temperature, and outside temperature.

The timer 7 measures the number of days that have passed from the time that the vehicle parts were exchanged. In other words, the timer 7 measures the number of days that have passed from the time that a user performed the reset operations for each vehicle part (hereinafter simply referred to as "usage time"). The timer 7 is connected to the maintenance period computation portion 13 included in the maintenance time notification device 5. The timer 7 transmits information concerning the usage time to the maintenance time notification device 5. It is also possible that the timer 7 functions only as a clock, and the usage time is measured by the maintenance time notification device 5 based on the timing information outputted by the timer 7.

The odometer 8 integrates the distance that the vehicle has traveled from the time that the vehicle parts were exchanged (hereinafter, simply referred to as "integrated distance"). The odometer 8 is connected to the maintenance period computation portion 13, similar to the timer 7. With respect to the maintenance period computation portion 13, the odometer 8 can transmit the distance traveled from the time the vehicle parts were exchanged, as an integrated value (an ODO value) to the maintenance period computation portion 13.

RAM 9 is a volatile memory used to temporarily save the computation results and files that were created while various processes were performed by the maintenance period computation portion 13. Data can be read from and written to the RAM 9 according to a command from the maintenance period computation portion 13.

EEPROM 10 is a nonvolatile memory from which stored information can be deleted according to a predetermined command from the maintenance period computation portion 13 to clear the stored information. The EEPROM 10 can store data such as the usage time, a determined distance of the traveling distance, and a determined time set for each of the multiple vehicle parts. In addition, the EEPROM 10 stores a table of the maintenance items, the determined distance, and the determined time in advance for each vehicle part. The following is a table of the maintenance items, the determined distance, and the determined time of the vehicle body parts.

TABLE 1

| MAINTENANCE ITEM | CORRESPONDING VEHICLE PART | DETERMINED DISTANCE (km) | DETERMINED TIME (day) |
|---|---|---|---|
| A | CONSUMABLE SUPPLY a | 3000 | 100 |
| B | CONSUMABLE SUPPLY b | 4000 | 120 |
| | CONSUMABLE SUPPLY c | | |
| 1 | CONSUMABLE SUPPLY d | 5000 | 150 |
| 2 | CONSUMABLE SUPPLY e | 6000 | 180 |
| 3 | CONSUMABLE SUPPLY f | 10000 | 300 |
| . | . | . | . |
| . | . | . | . |
| . | . | . | . |

The determined distance and the determined time respectively refer to an integrated distance and a usage time at which maintenance operations are recommended, and the integrated distance and the usage time are predetermined for each vehicle part. For example, with respect to the maintenance item "A," the corresponding determined distance is 3,000 km, and the corresponding determined time is 100 days. If either the vehicle has traveled 3,000 km after the vehicle part "A" was exchanged, or 100 days have passed since the vehicle part "A" was exchanged, or if both of the above conditions are satisfied, it is reported that it is time for the maintenance operation to be performed on the vehicle part "A." A maintenance item refers to an identifier made up of a number, letter, or a figure used to identify a vehicle part. Incidentally, the value listed in the above table is only an example, and the present embodiment is not limited by these values. Furthermore, examples of vehicle parts associated with a determined distance and a determined time include various fluids, various filters, wiper rubber, air cleaner element, a wire of a parking brake, and the like.

The usage time measured by the timer 7 is stored in the EEPROM 10, and the usage time corresponds to each of the above maintenance items. In addition, the integrated distance computed by the odometer 8 is stored in the EEPROM 10, and the integrated distance corresponds to each of the above maintenance items. The following is an example of a table showing an integrated distance and the elapsed time (usage time), each of which were stored corresponding to each of these maintenance items.

TABLE 2

| MAINTENANCE ITEM | INTEGRATED DISTANCE (km) | ELAPSED TIME (day) |
|---|---|---|
| A | 200 | 10 |
| B | 500 | 40 |
| 1 | 0 | 0 |
| 2 | 3000 | 170 |
| 3 | 7000 | 272 |

A remaining distance can be computed by subtracting the integrated distance, calculated by the odometer 8, from the determined distance. The remaining distance is a remaining traveling distance required to reach the determined distance. In addition, a remaining number of days can be computed by subtracting the usage time, measured by the timer 7, from the determined time. The remaining number of days is a remaining time required to reach the determined time. The computation of the remaining distance and the remaining number of days is constantly performed by a maintenance period computation portion 13, described below.

In addition, the EEPROM 10 stores a warning distance display threshold (for example, approximately 1,000 km) which is predetermined as a threshold corresponding to the remaining distance. The EEPROM 10 also stores a warning distance extraction threshold (for example, approximately 3,000 km) which is set to be a longer distance compared to the warning distance display threshold. Similarly, the EEPROM 10 stores a warning time display threshold (for example, approximately 30 days) which is predetermined as a threshold corresponding to the remaining number of days. The EEPROM 10 also stores a warning time extraction threshold (for example, approximately 60 days) which is set to be a larger number of days compared to the warning time display threshold.

The EEPROM 10 stores various setting information regarding the meter 1 immediately before the ignition is turned off. When the ignition is turned on again based on these various setting information, the setting of the meter 1 is maintained to those immediately before the ignition was turned off.

The maintenance time notification device 5 mainly includes the reset controlling unit 11, a display controlling unit 12, and the maintenance period computation portion 13.

The reset controlling unit 11 receives from the select reset switch 6, a reset request and a request to switch over the display. The reset controlling unit 11 then outputs to the maintenance period computation portion 13, a request to clear each of the values outputted by the timer 7 and the odometer 8. By clearing the values outputted by the timer 7 and the odometer 8, the values of the above remaining distance and the remaining number of days stored for each of the vehicle parts return to an initial value, in other words, the value of the determined distance and the determined time.

The display controlling unit 12 performs a displaying control of the multi-information display 2 and displays various maintenance information to the multi-information display 2. In more detail, the display controlling unit 12 displays to the liquid crystal displaying unit 3 of the multi-information display 2, information concerning the maintenance items outputted by the maintenance period computation portion 13 as well as information concerning certain figures. In addition, the display controlling unit 12 performs a control so that the predetermined distance or the predetermined time and their units outputted by the maintenance period computation portion 13 are displayed on the indicator 4 of the multi-information display 2.

The display controlling unit 12 controls the renewal process of the remaining distance and the remaining time displayed on the indicator 4 of the multi-information display 2. For example, in the case of the remaining time, the display controlling unit 12 performs the control so that the remaining time is renewed when it is determined that a predetermined number of days have passed from the time that the remaining time was previously renewed. As another example, in the case of the remaining distance, the display controlling unit 12 performs the control so that the remaining distance is renewed when it is determined that the vehicle has traveled a predetermined distance from the time that the remaining distance was renewed previously. The predetermined time is set in advance so that, in the case of a user who does not use the vehicle often and thus has a small estimated annual traveling distance, an appropriate time interval is obtained for renewal. The predetermined distance is set according to the estimated annual traveling distance so that, in the case of a user who used the vehicle frequently and thus has a long estimated annual traveling distance, an appropriate time interval is obtained for renewal.

The maintenance period computation portion 13 performs various kinds of controls within the maintenance time notification device 5. In more detail, the maintenance period computation portion 13 constantly computes the remaining distance and the remaining time for each of the multiple vehicle parts, based on the usage time and the integrated distance stored in the EEPROM 10 for each maintenance item. The remaining distance and the remaining time computed most recently are temporarily stored in the RAM 9.

The maintenance period computation portion 13 determines whether or not the computed remaining distance of each of the multiple vehicle parts has reached the warning distance extraction threshold and the warning distance display threshold which are stored in advance in the EEPROM 10. Similarly, the maintenance period computation portion 13 determines whether or not the computed remaining number of days for each of the multiple vehicle parts has reached the warning time extraction threshold and the warning time display threshold which are stored in advance in the EEPROM 10. Based on the results of these tests, the maintenance period computation portion 13 determines the maintenance item and the remaining distance or the remaining number of days that will be displayed on the multi-information display 2, and outputs the information to the display controlling unit 12.

The maintenance period computation portion 13 determines the estimated annual traveling distance based on the pattern of the annual traveling distance of the vehicle obtained according to the output of the timer 7 and the odometer 8. The estimated annual traveling distance is an estimate of the total traveling distance throughout the year. For example, the estimated annual traveling distance can be computed by setting one day as the unit of time, and multiplying the integrated distance traveled in one day by 365 (the number of days in a year).

Then, the maintenance period computation portion 13 searches for the minimum remaining distance and the minimum remaining time among all of the remaining distance and the remaining time of the vehicle parts stored in the RAM 9. Then, the maintenance period computation portion 13 converts the minimum remaining distance to a value of the remaining time using the estimated annual travelling distance, and compares this converted value with the minimum remaining time. If the converted value is less than or equal to the minimum remaining time, the maintenance period computation portion 13 outputs the information concerning the minimum remaining distance before the conversion to the display controlling unit 12. On the other hand, when the minimum remaining time is less than the converted value, the maintenance period computation portion 13 outputs the information concerning the minimum remaining time to the display controlling unit 12. The integrated distance associated with the vehicle part having the minimum remaining distance and stored in the EEPROM 10 becomes an integrated distance that is closest to the maintenance limit of the integrated distance considering all of the vehicle parts. The usage time associated with the vehicle part having the minimum remaining time and stored in the EEPROM 10 becomes a usage time that is closest to the maintenance limit of the usage time considering all of the vehicle parts.

Next, a detailed explanation is provided regarding the determination of the information outputted from the maintenance period computation portion 13 to the display controlling unit 12. First, if there is a vehicle part that has a remaining distance and a remaining time, at least one of which has reached the warning time display threshold or the warning distance display threshold, the maintenance item of this vehicle part is determined as a maintenance item information that will be outputted to the display controlling unit 12.

Furthermore, when there is a vehicle part with a remaining time or a remaining distance that has reached the warning time display threshold or the warning distance display threshold (hereinafter, simply referred to as a "warning displaying vehicle part"), and if there is a vehicle part with a remaining time or a remaining distance that has only reached the warning time extraction threshold or the warning distance extraction threshold (hereinafter, simply referred to as a "warning extraction vehicle part"), the information concerning the maintenance item of the above warning displaying vehicle part and the information concerning the maintenance item of the warning extraction vehicle part are determined to be a maintenance item information that will be outputted to the display controlling unit 12. The remaining distance and the remaining time of vehicle parts that have only reached the warning time extraction threshold or the warning distance extraction threshold will not be outputted to the display controlling unit 12 as the information concerning the remaining distance and the remaining time.

When the remaining time or the remaining distance of a warning displaying vehicle part closest to the maintenance limit, among all of the warning displaying vehicle parts, has reached a figure switchover threshold, used to determine whether the maintenance limit is impending, the maintenance period computation portion 13 outputs to the display controlling unit 12, a control command to switch over the displaying condition of multiple figures shown on the liquid crystal displaying unit 3.

Figure 2:
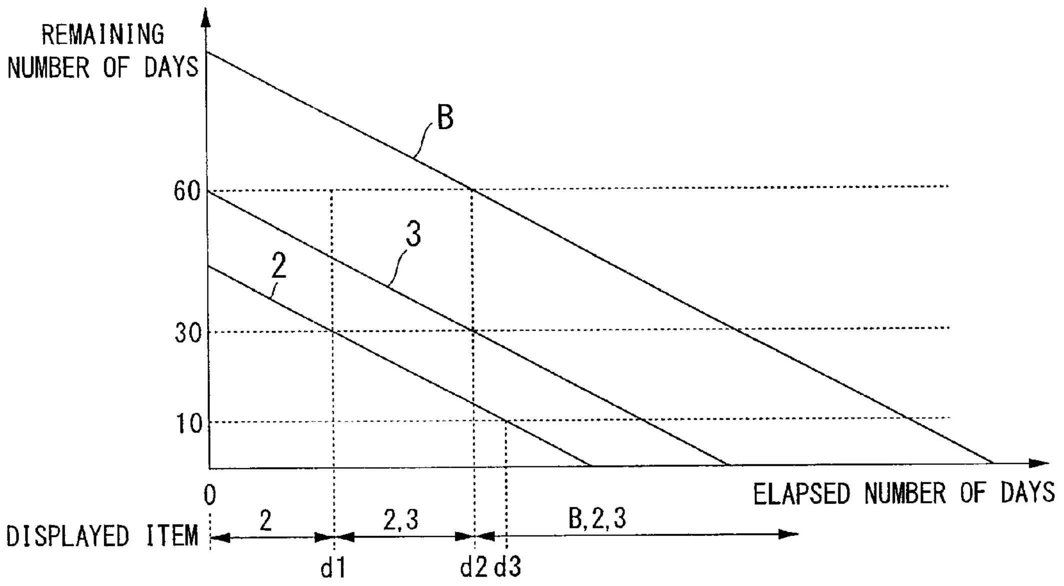
FIG. 2 is a graph showing a remaining number of days corresponding to each maintenance item with respect to a number of days that has passed according to the above embodiment.
Figure 3:
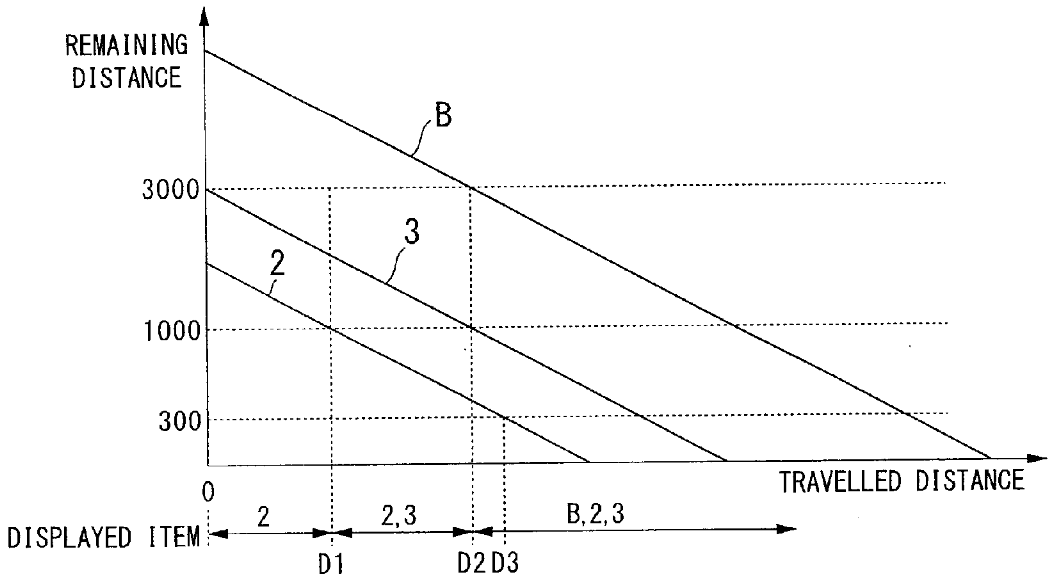
FIG. 3 is a graph showing a remaining distance corresponding to each maintenance item with respect to a traveling distance according to the above embodiment.

Next, an explanation is provided with reference to FIGS. 2 and 3 regarding a control by the maintenance period computation portion 13 to determine the information concerning maintenance items. In other words, an explanation is provided regarding a concrete example of a display switchover control of a maintenance item.

The vertical axis of FIG. 2 represents the remaining time, and the horizontal axis of FIG. 2 represents the elapsed time (usage time). FIG. 2 shows an example of a graph representing the transition of the remaining time which is stored in association with maintenance items "2," "3." and "B." The lower portion of this graph indicates the items displayed on the multi-information display 2 in accordance with the transition of the remaining time of each vehicle part. Since each of the above remaining times decrease as the elapsed number of days increases, the graphs of the maintenance items are parallel and are sloped downward.

First, as shown in FIG. 2, when the remaining time of all of the maintenance items is such that the elapsed time is less than d1, d1 meaning the number days short of the 30 day warning time display threshold, the information concerning maintenance item "2" indicating the vehicle part with the remaining time closest to the maintenance limit, i.e., remaining number of days being "zero," is outputted from the maintenance period computation portion 13 to the display controlling unit 12. The maintenance item "2" is displayed on the liquid crystal displaying unit 3. However, information concerning maintenance item "3," which has only reached the 60 day warning time extraction threshold, will not be outputted.

Next, when the elapsed number of days becomes d1, and the remaining time of the maintenance item "2" becomes the 30 day warning time display threshold, information concerning maintenance item "3," the remaining time of which has only reached the 60 day warning time extraction threshold, is outputted from the maintenance period computation portion 13 to the display controlling unit 12, along with information concerning maintenance item "2," the remaining time of which has already reached 30 days. Thus, the maintenance items "2" and "3" are displayed on the liquid crystal displaying unit. However, information concerning maintenance item "B," the remaining time of which has not reached the 60 day warning time extraction threshold, will not be outputted from the maintenance period computation portion 13 to the display controlling unit 12.

Further, when the elapsed number of days becomes d2, and the remaining time of the maintenance item "B" reaches the 60 day warning time extraction threshold, the maintenance period computation portion 13 outputs the information concerning maintenance item "B" to the display controlling unit 12, along with the above information concerning the maintenance items "2" and "3." Incidentally, even though the remaining time of a maintenance item becomes "0," the output of the information concerning this maintenance item will be retained as long as the user does not perform the resetting operation with the select/reset switch 6.

Further, when the elapsed number of days becomes d3, and the remaining time of the maintenance item "2," which is closest to the maintenance limit, reaches the 10 day image switchover threshold, the maintenance period computation portion 13 outputs a control command to the display controlling unit 12 so that, among the plurality of figures being displayed on the liquid crystal displaying unit 3, a certain figure will no longer be displayed.

The vertical axis of FIG. 3 represents the remaining distance, and the horizontal axis of FIG. 3 represents the traveling distance (integrated distance). FIG. 3 shows an example of a graph representing the transition of the remaining distance that is stored in association with each of the maintenance items "2," "3," and "B." The bottom portion of this graph indicates the displayed items of the multi-information display 2 corresponding to the transition of the remaining time of each vehicle part. Each of the above remaining distances decrease as the traveling distance increases. Therefore, the graphs of the maintenance items are parallel and are sloped downward.

First, as shown in FIG. 3, when the remaining distance of all of the maintenance items has not reached the 1,000 km warning distance display threshold, information concerning maintenance item "2" indicating the vehicle part closest to the maintenance limit, i.e., the remaining distance being "0," is outputted from the maintenance period computation portion 13 to the display controlling unit 12. This maintenance item "2" is displayed on the liquid crystal displaying unit 3. However, information concerning maintenance item "3" which has only reached the 3,000 km warning distance extraction threshold, will not be outputted.

Further, when the traveling distance becomes distance D1, and the remaining distance of the maintenance item "2" reaches the 1,000 km warning distance display threshold, the information concerning maintenance item "3," the remaining distance of which has only reached the 3,000 km warning distance extraction threshold, will be outputted from the maintenance period computation portion 13 to the display controlling unit 12, along with information concerning maintenance item "2," the remaining distance of which has already reached the 1,000 km warning distance display threshold. Thus, maintenance items "2" and "3" are displayed on the liquid crystal displaying unit. However, information concerning maintenance item "B," the remaining distance of which has not reached the 3,000 km warning distance extraction threshold, will not be outputted from the maintenance period computation portion 13 to the display controlling unit 12.

Further, when the traveling distance becomes distance D2, and the remaining distance of the maintenance item "B" reaches the 3,000 km warning distance extraction threshold, the maintenance period computation portion 13 outputs the information concerning maintenance item "B" to the display controlling unit 12 along with the above information concerning maintenance items "2" and "3." Thus, maintenance items "2," "3," and "B" are displayed to the liquid crystal displaying unit 3. Even though the remaining distance of a maintenance item becomes "0," the output of the information concerning this maintenance item is retained as long as the user does not perform the resetting operation with the select/reset switch 6.

When the travelling distance becomes distance D3, and the remaining distance of the maintenance item "2," which is closest to the maintenance limit, reaches the 300 km image switchover threshold, the maintenance period computation portion 13 outputs a control command to the display controlling unit 12 so that, among the plurality of figures being displayed on the liquid crystal displaying unit 3, a certain figure will no longer be displayed.

In other words, the maintenance period computation portion 13 outputs the display items shown in FIG. 2, the display items shown in FIG. 3, and all of the information concerning the display items to the display controlling unit 12, and then displays them to the liquid crystal displaying unit 3 of the multi-information display 2. Incidentally, the values of each of the thresholds described above are only an example, and are by no means considered to be limiting. When there is a maintenance item that has reached both the warning time display threshold and the warning distance display threshold, this maintenance item will not be displayed twice at the same time.

Figure 4:
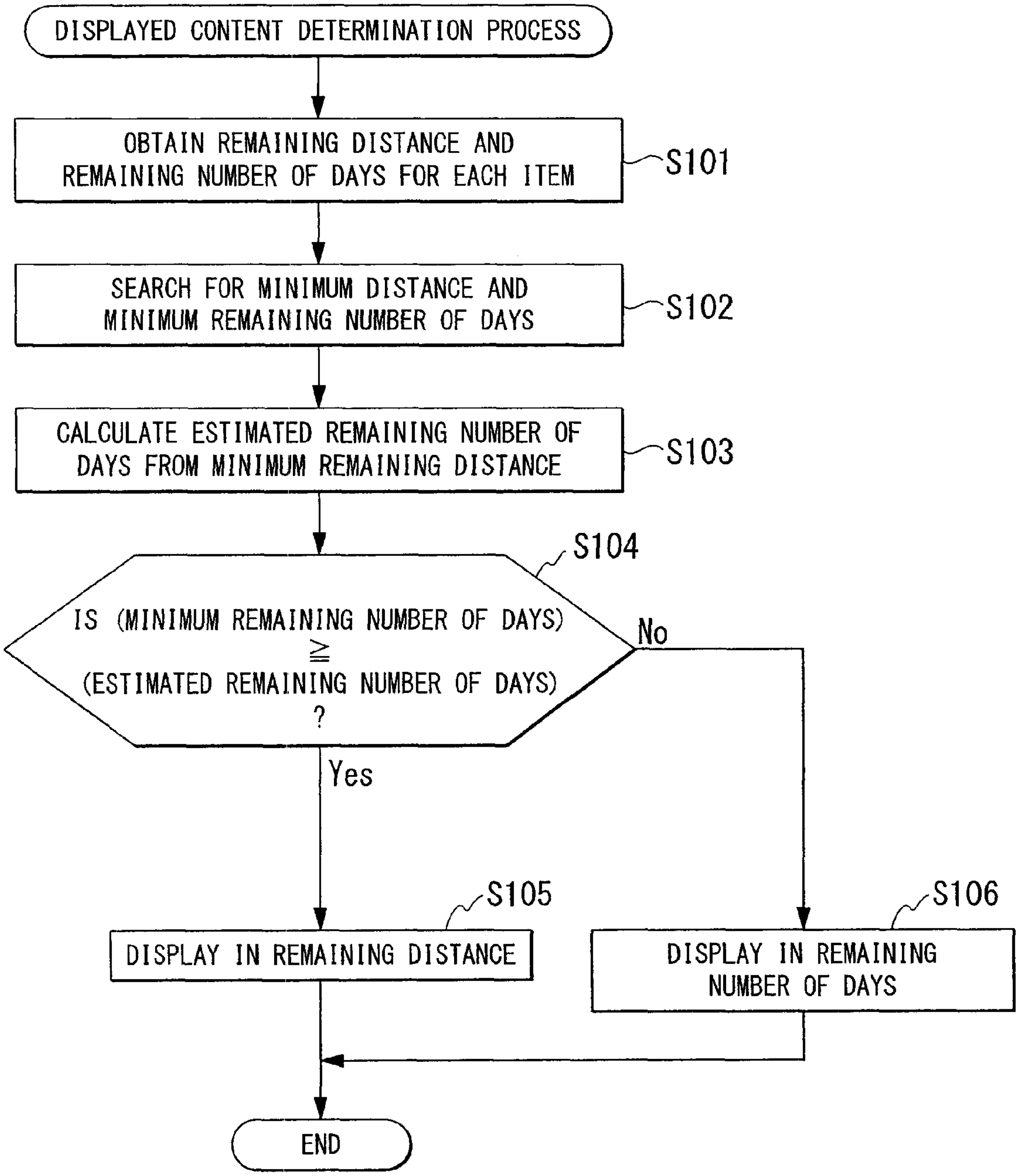
FIG. 4 is a flowchart of a display content determination procedure according to the above embodiment.

Next, an explanation is provided with reference to the flowchart shown in FIG. 4 concerning a display content determination process performed by the maintenance period computation portion 13. The display content determination process refers to the process of determining the content that will be displayed on the indicator 4.

First, in step S101, information concerning the remaining distance and the remaining time, stored in the RAM 9 and associated with each of the maintenance items, is obtained.

In step S102, the minimum remaining distance and the minimum remaining time are searched for among the obtained remaining distance and the obtained remaining time.

In step S103, the estimated remaining time, which is a converted value, is computed from the minimum remaining distance according to formula (I) shown below.

$$\text{(estimated remaining time)} = \text{(minimum remaining distance)}/\text{(estimated annual travelling distance)} \times 365 \quad (1)$$

For example, when the minimum remaining distance is 1,000 km, and the estimated annual travelling distance is 24,000 km, the estimated remaining time becomes 15.2. In addition, when the minimum remaining distance is set to be constant, the value of the estimated remaining time becomes smaller as the value of the estimated annual travelling distance becomes larger.

In step S104, it is determined whether or not the estimated remaining time computed in step S103 is less than or equal to the minimum remaining time. If the result of step S104 is "Yes" (minimum remaining time≧estimated remaining time), the routine proceeds to step S105. If the result of step S104 is "No" (minimum remaining time<estimated remaining time), the routine proceeds to step S106.

In step S105, the minimum remaining distance before a conversion is made to the estimated remaining time is displayed on the indicator 4 of the multi-information display 2. In step S106, the minimum remaining time is displayed on the indicator 4 of the multi-information display 2, and the routine returns. In the above display content determination process, the minimum remaining distance was converted to a unit of the remaining time based on the estimated annual traveling distance, and the comparison was made. However, it is also possible to make a comparison by converting the minimum remaining time to the remaining distance based on the estimated annual traveling distance.

Next, an example of a display on the above multi-information display 2 at a maintenance period is described with reference to FIGS. 5A through 8B along with the above graphs shown in FIGS. 2 and 3. Considering FIGS. 5A through 8B, an example of a remaining distance being displayed on the indicator 4 is shown in FIGS. 5A, 6A, 7A, and 8A. In addition, FIGS. 5B, 6B, 7B, and 8B show an example of a remaining time being displayed on the indicator 4.

Figure 5A:
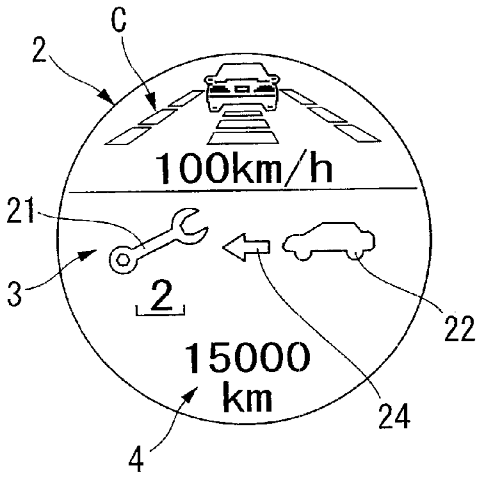
FIG. 5A is a frontal view of a multi-information display at the time of a normal displaying mode according to the above embodiment.
Figure 5B:
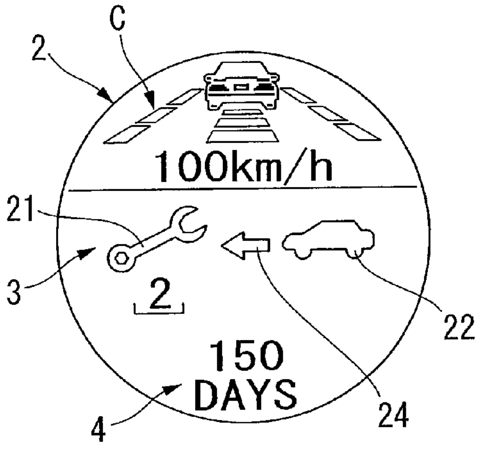
FIG. 5B is a frontal view of a multi-information display at the time of a normal displaying mode according to the above embodiment.

FIGS. 5A and 5B respectively represent a normal displaying mode that is displayed when the remaining time and the remaining distance of each maintenance item are larger than the number of days d1 and the distance D1 of FIGS. 3 and 4, in other words, when the remaining distance and the remaining time of all of the maintenance items have not reached the warning time display threshold and the warning distance display threshold.

As shown in FIG. 5A, the liquid crystal displaying unit 3 is placed in a center portion of the multi-information display 2, and the indicator 4 is placed in its lower portion. In addition, a cruise displaying unit C is placed in an upper portion of the multi-information display 2. A predetermined value of a vehicle speed (100 km/h in the figure) of a vehicle, equipped with a cruise mode which controls the vehicle speed to a constant value at highways and the like, is displayed on this cruise displaying unit C along with a mark (pictorial figure) of a vehicle running on a road.

A mark (pictorial figure) of a spanner 21 and a mark (pictorial figure) of a vehicle 22 are displayed on the liquid crystal displaying unit 3 shown in FIGS. 5A and 5B, along with a mark (pictorial figure) of an arrow 24 pointing in a direction from the mark of the vehicle 22 to the mark of the spanner 21. Below each of the above marks 21, 22, and 24, only the maintenance item that is closest to the maintenance limit (maintenance item “2” in the figure) is displayed.

On the indicator 4 shown in FIG. 5A, “15000 km” is displayed as the minimum remaining distance determined by the display content determination process described above with reference to FIG. 4. On the indicator 4 shown in FIG. 5B, “150 DAYS” is displayed as the minimum remaining time determined by the display content determination process described above with reference to FIG. 4.

Figure 6A:
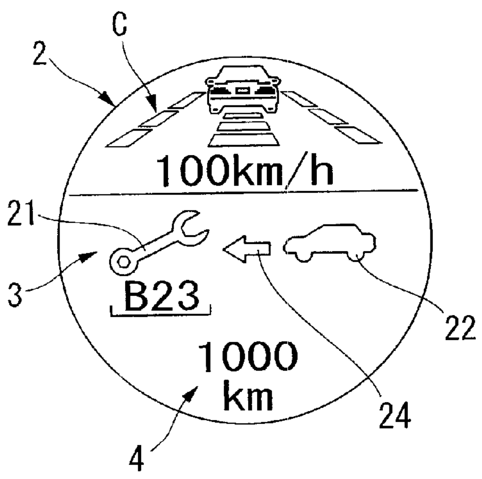
FIG. 6A is a frontal view of a multi-information display at the time of a warning displaying mode according to the above embodiment.
Figure 6B:
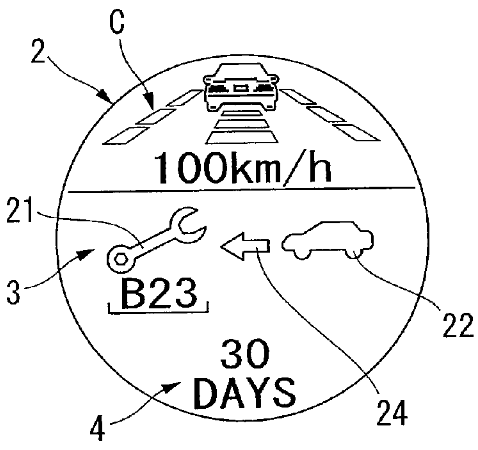
FIG. 6B is a frontal view of a multi-information display at the time of a warning displaying mode according to the above embodiment.

FIGS. 6A and 6B represent a warning displaying mode displayed when, for example, the elapsed time shown in the horizontal axis of FIG. 2 is between d2 to d3 days, or, the traveling distance shown in the horizontal axis of FIG. 3 is between D2 and D3. Maintenance items “B” and “3” are each added to the liquid crystal displaying unit 3 of FIGS. 5A and 5B. Here, on the indicator 4 shown in FIG. 6A, “1000 km” is displayed as the minimum remaining distance at the time of the display. Meanwhile, on the indicator 4 shown in FIG. 6B, “50 DAYS” is displayed as the minimum remaining time at the time of the display.

Figure 7A:
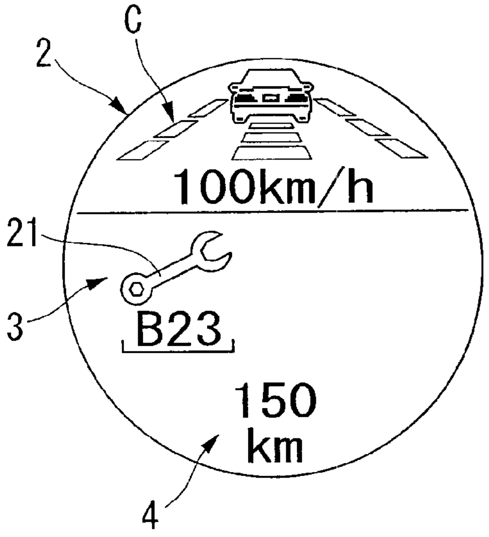
FIG. 7A is a frontal view of a multi-information display at the time of an exchange displaying mode according to the above embodiment.
Figure 7B:
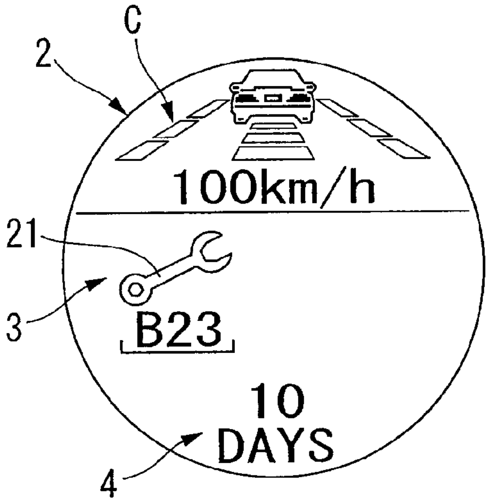
FIG. 7B is a frontal view of a multi-information display at the time of an exchange displaying mode according to the above embodiment.

FIGS. 7A and 7B represent an exchange displaying mode which is displayed when, for example, among the graphs of the remaining time and remaining distance of each maintenance item shown in FIGS. 2 and 3, the remaining time of the maintenance item that is closest to the maintenance limit has reached the 10 day image switchover threshold shown in FIG. 2, or, the remaining distance of the maintenance item that is closest to the maintenance limit has reached the 300 km image switchover threshold shown in FIG. 3. The mark of the vehicle 22 and the mark of the arrow 24, which were displayed in FIGS. 6A and 6B, disappear from the liquid crystal displaying unit in FIGS. 7A and 7B, and only the mark of the spanner 21 is displayed. By displaying only the mark of the spanner 21, the user can comprehend that, among the maintenance items that are displayed, the maintenance limit of the vehicle part corresponding to at least one maintenance item is impending.

Figure 8A:
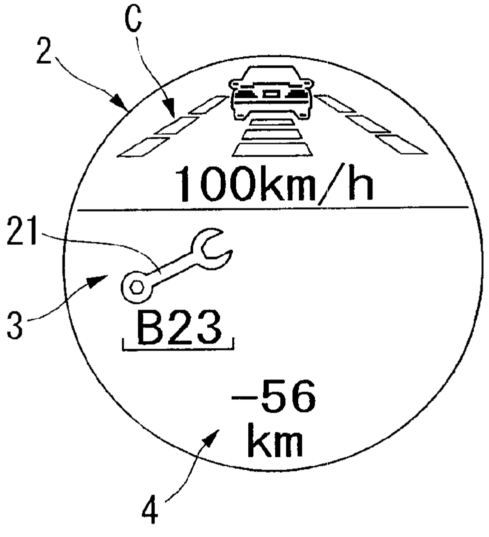
FIG. 8A is a frontal view of a multi-information display at the time of a progression displaying mode according to the above embodiment.
Figure 8B:
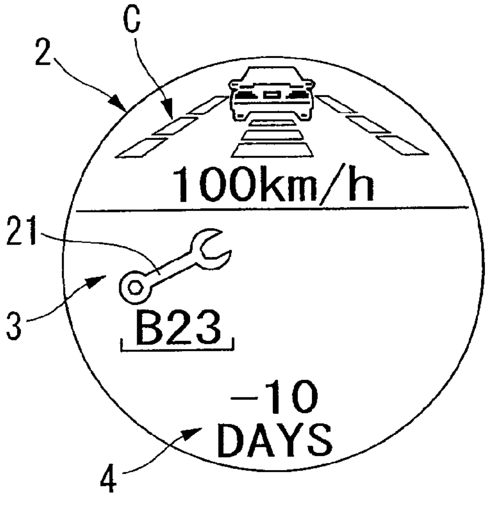
FIG. 8B is a frontal view of a multi-information display at the time of a progression displaying mode according to the above embodiment.

FIGS. 8A and 8B represent a progression displaying mode that is displayed when, for example, the minimum remaining time among the remaining times of each of the maintenance items has exceeded the maintenance limit. The contents displayed in this progression displaying mode is basically the same as that displayed in the exchange displaying mode shown in FIG. 7. However, because the minimum remaining time or the minimum remaining distance is below “0,” the value displayed on the indicator 4 becomes negative. Further, at the time of the progression displaying mode, it is necessary to promptly perform the maintenance operations. Therefore, the user can be urged to perform the maintenance operation by, for example, blinking the mark of the spanner 21.

Therefore, according to the above embodiment, when the maintenance item of a vehicle part with a remaining time or a remaining distance that has reached the warning time display threshold or the warning distance display threshold is being displayed, the maintenance item of a vehicle part that has only reached the warning time extraction threshold and the warning distance extraction threshold, which are respectively a usage time and a traveling distance set to be longer than the warning time display threshold and the warning distance display threshold, is reported along with the maintenance item of the vehicle part that has reached the warning time display threshold and the warning distance display threshold. In this way, the user can recognize the vehicle part that needs maintenance, along with the vehicle part with an impending maintenance limit. As a result, it is possible to reduce the number of times that the vehicle is warehoused to the dealer for maintenance, thus lessening the burden of the user.

In addition, multiple maintenance operations can be performed in one incident of the vehicle being warehoused. As a result, it is possible for a maintenance personnel of the dealer to reduce the number of operations such as disassembling. Therefore, the burden of the maintenance personnel can also be reduced.

In addition, the warning time display threshold, the warning distance display threshold, the warning time extraction threshold, the warning distance extraction threshold, and the image switchover threshold are set to be a common threshold for each maintenance item. As a result, it is possible to reduce the amount of information that is stored in the EEPROM 10. Consequently, the capacity of the EEPROM 10 can be controlled.

In addition, it is possible to compare a converted value, obtained by converting the minimum remaining distance to a unit of the minimum remaining time, with the minimum remaining time, and then display the minimum remaining distance before the conversion to the indicator 4 when the converted value is smaller than the value of the minimum remaining time. It is also possible to display the value of the minimum remaining time to the indicator 4 when the value of the minimum remaining time is smaller than the converted value. Therefore, it is possible to display appropriately based on the frequency with which the vehicle is used.

In addition, when none of the remaining time or the remaining distance of the maintenance items has reached the warning time display threshold and the warning distance display threshold, it is possible to constantly report to the user, a maintenance item of the vehicle part with the closest maintenance limit, as well as the remaining time or the remaining distance that have been stored in association with this maintenance item. As a result, the user can be made constantly aware of the most impending maintenance limit. Therefore, the merchantability can be enhanced.

Furthermore, when the remaining time or the remaining distance of the vehicle part, which has reached the warning time display threshold and the warning distance display threshold, reaches the figure switchover threshold immediately before the maintenance limit, a report can be made by deleting the mark of the vehicle 22 and the mark of the arrow 24 from what is displayed on the liquid crystal displaying unit 3. Therefore, the user can easily recognize that the maintenance limit is impending.

In addition, the user can comprehend the types of vehicle body parts by the name of the maintenance items displayed on the multi-information display 2. Therefore, the display can be simplified compared to, for example, displaying all of the names of the vehicle parts. As a result, the displaying part has more freedom to position what is displayed.

Moreover, when the display controlling unit 12 determines the renewal of the indicator 4, the remaining time reaches the predetermined number of days first if the estimated annual traveling distance of the vehicle is relatively small. When the estimated annual running distance is relatively large, the remaining distance reaches the travelling distance corresponding to the predetermined time first. As a result, it is possible to prevent a decline in the reliability of the display concerning the maintenance time due to the display not being renewed frequently enough. It is also possible to prevent the contents of the display from flickering and becoming hard to look at due to the display being renewed too frequently. Thus, the merchantability can be improved. The user can also comprehend the contents of the display more easily.

Next, a variation of the above embodiment is described with reference to FIGS. 9 through 12. In this variation of the embodiment, a displaying control at the time the ignition is turned on is added to the control performed by the maintenance period computation portion 13 in the embodiment described above. Therefore, only the different aspects are explained. The same parts are referred to with the same reference symbols/numbers, and the explanation concerning these same parts are abbreviated.

Figure 9:
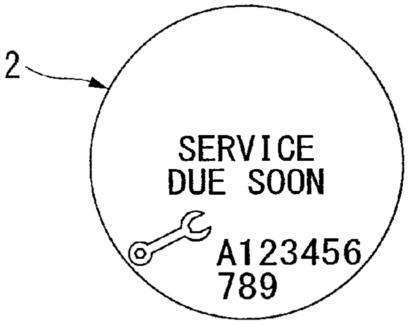
FIG. 9 is a frontal view of a multi-information display at the time of an a warning displaying mode according to a variation of the above embodiment.

FIG. 9 concerns a warning displaying mode, in which the minimum remaining time, described above, was reached thirty days before the maintenance limit, i.e., at the warning time display threshold. FIG. 9 represents an example of a screen display shown on the multi-information display 2 immediately after the ignition of the vehicle is turned ON.

At a center of the screen of the multi-information display 2 shown in FIG. 9, a message is displayed indicating that the maintenance limit is impending (for example, "SERVICE DUE SOON"). Below this message, a mark of the spanner is displayed, indicating that the screen is a maintenance displaying screen. Also below the message, all of the maintenance items of the vehicle parts with an impending maintenance limit are displayed (A, 1, 2, 3, 4, 5, 6, 7, 8, and 9 in the figure). Here, the displaying screen immediately after the ignition is turned ON is displayed for only a few seconds along with a warning sound (same as in FIGS. 10 to 12 below). This description relates to the case in which the minimum remaining time has reached the 30 day warning time display threshold. This description similarly applies to the case in which the minimum distance has reached the warning distance display threshold.

Figure 10:
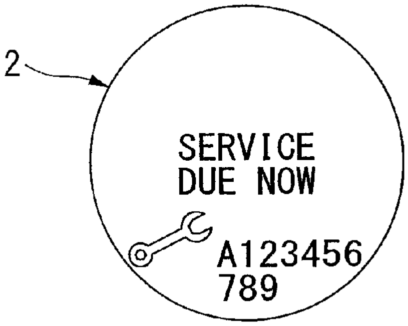
FIG. 10 is a frontal view of a multi-information display at the time of an exchange displaying mode according to a variation of the above embodiment.

FIG. 10 represents an example of a displaying screen that is shown on the multi-information display 2 immediately after the ignition of the vehicle is turned ON, similar to FIG. 9. FIG. 10 represents an example of the displaying screen of the multi-information display 2 shown in the case of the exchange displaying mode when the minimum remaining time, i.e., the figure switchover threshold, has been reached ten days earlier. In the displaying screen shown in FIG. 10, the message display shown in FIG. 9 indicating that the maintenance limit is impending, is switched over to a display indicating that the maintenance limit has been reached (for example, "SERVICE DUE NOW").

Figure 11:
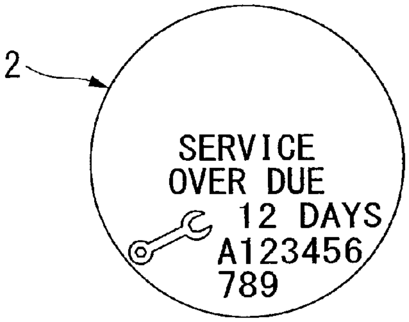
FIG. 11 is a frontal view of a multi-information display at the time of a progression displaying mode according to a variation of the above embodiment.
Figure 12:
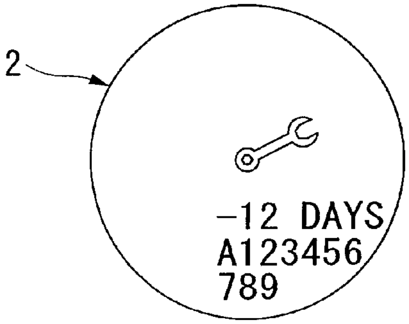
FIG. 12 is a frontal view of a multi-information display at the time of a progression displaying mode according to another aspect of a variation of the above embodiment.

FIG. 11 represents an example of a displaying screen shown on the multi-information display 2 immediately after the ignition is turned ON in the case of the progression displaying mode when the remaining time is such that the maintenance limit has passed. On the multi-information display 2 shown in FIG. 11, a message is displayed in a central portion of the screen indicating that the maintenance limit has passed (for example, "SERVICE OVER DUE"). In an upper portion of the maintenance items in FIG. 9, the number of days by which the maintenance limit has been exceeded is displayed ("12 DAYS" in the figure). Incidentally, FIG. 12 is another embodiment of the displaying screen shown in FIG. 11. The message display is abbreviated in FIG. 12 compared to FIG. 11. In FIG. 12, the fact that the maintenance limit has passed is reported by displaying the number of days by which the maintenance limit has been exceeded as a negative value.

Therefore, according to the above variation of the embodiment, even though a display concerning the maintenance period is not selected as the content normally displayed on the multi-information display 2, the maintenance period computation portion 13 performs a control so that a displaying screen reporting the maintenance period to the user is displayed immediately after the ignition is turned ON. Therefore, the user can be aware of the maintenance period with more reliability.

In the above embodiment, an explanation was provided concerning the case where various threshold values such as the warning time display threshold, the warning time extraction threshold, the warning distance display threshold, the warning distance extraction threshold, and the image switchover threshold were set to be a common threshold of the remaining distance and the remaining time of multiple maintenance items. However, it is possible to, for example, individually set the values of the above threshold values for each maintenance item.

In addition, according to the above embodiment, the user was notified by the displaying of maintenance items, a literal display of the remaining distance or the remaining time, and a switchover of the displayed figures. However, the way in which the report is made is not limited to a display. For example, it is possible to report with a sound or the lighting of a lamp or an LED.

Further, the above explanation related to a case in which the maintenance limit is reached when the computed remaining distance and the remaining time reached "0." However, a configuration is possible such that the maintenance limit is reached when an integrated distance, which is an integrated value of the traveling distance from the time that the vehicle part began to be used, and a usage time respectively reaches an upper limit value of a predetermined integrated distance and an integrated usage time. In this case, the warning time extraction threshold and the warning time display threshold are set to be a threshold of the usage time. The warning time extraction threshold becomes a predetermined value that is smaller than the warning display threshold. In addition, the warning distance extraction threshold and the warning distance display threshold are set to be a threshold value of the integrated distance. The warning distance extraction threshold becomes a predetermined value smaller than the warning distance display threshold.

The above explanation related to a case in which the number of days was used as a parameter of time. However, the parameter of time is not limited to the number of days, as long as the parameter is related to time.

The above explanation related to a case in which the remaining time and the remaining distance were set in advance for each vehicle part. However, concerning an engine oil and the like, which has an operating time that fluctuates according to the environment in which they are used, such as the number of rotations of the engine and temperature conditions, the remaining time and the remaining distance can be computed by the ECU of the engine based on measured values of, for example, the number of rotations of the engine and the temperature. The computed results can then be compared to the warning time extraction threshold, the warning time display threshold, the warning distance extraction threshold, and the warning distance display threshold. In this case, when the usage environment changes to that with rigorous conditions, for example, the graph of the remaining time and the graph of the remaining distance shown in FIGS. 2 and 3 generally shift to the left.

Further, according to the above embodiment, the usage time was measured by the timer 7, and the integrated distance was calculated by the odometer 8. However, the usage time and the integrated distance can be obtained using various other methods. For example, the RAM can save the integrated distance of the vehicle at a point when the reset operation for each vehicle part has been performed with the select/reset switch 6 (which is different from the integrated distance for each vehicle part), and the time. An integrated distance and a usage time can then be obtained by subtracting the values saved above from the current integrated distance of the vehicle and the current time.

INDUSTRIAL APPLICABILITY

According to the present invention, a maintenance time notification device can be provided, which can reduce the number of times that the vehicle is warehoused to the dealer for maintenance, and also lessen the burden on the user.

The invention claimed is:

1. A maintenance time notification device comprising:

a storing unit storing a usage time threshold value or a traveling distance threshold value for each of a plurality of vehicle parts;

a measuring unit measuring a usage time and a traveling distance of a vehicle since the vehicle began to be used, for each of the vehicle parts;

a maintenance period determination unit determining a maintenance period of each of the vehicle parts by comparing the usage time with the usage time threshold value or the traveling distance with the traveling distance threshold value; and a reporting unit reporting to a passenger based on a determination result of the maintenance period determination unit, wherein the storing unit stores a first threshold value being one of the usage time threshold value and the traveling distance threshold value required to reach a maintenance limit, the storing unit also storing a second threshold value, said second threshold value being set so that the usage time and the traveling distance required to reach the maintenance limit is longer than usage time and traveling distance required to reach the maintenance limit from the first threshold value;

the maintenance period determination unit determines whether or not there is a vehicle part with at least one of the usage time and the traveling distance that has reached the first threshold value, the maintenance period determination unit also determining whether or not there is a vehicle part with at least one of the usage time and the traveling distance that has reached the second threshold value, the maintenance period determination unit also determining, from among the usage time and the traveling distance of each of the vehicle parts measured by the measuring unit, a one usage time closest to the maintenance limit and a one traveling distance closest to the maintenance limit, the maintenance period determination unit also performing a conversion by converting either said one usage time closest to the maintenance limit into a converted traveling distance or said one traveling distance closest to the maintenance limit into a converted usage time, the maintenance period determination unit also performing a comparison of the converted traveling distance with said one traveling distance or the converted usage time with said one usage time;

based on the determination result of the maintenance period determination unit, the reporting unit only reports the vehicle part that has reached the first threshold value to the passenger when there is only the vehicle part that has reached the first threshold value, and, when there is a vehicle part with the usage time or the traveling distance that has reached the first threshold value in addition to a vehicle part with the usage time or the traveling distance that has only reached the second threshold value, the reporting unit reports both the vehicle part that has reached the first threshold value along with the vehicle part that has only reached the second threshold value to the passenger, when the comparison shows that the converted usage time is closer to the maintenance limit than is the one usage time, the reporting unit reports to the passenger one traveling distance without reporting the one usage time, and, when the comparison shows that the converted traveling distance is closer to the maintenance limit than is the one traveling distance, the reporting unit reports to the passenger the one usage time without reporting the one traveling distance, and, when the comparison shows that the one usage time is closer to the maintenance limit than is the converted usage time, the reporting unit reports the one usage time to the passenger without reporting the converted usage time, and, when comparison shows that the one traveling distance is closer to the maintenance limit than is the converted traveling distance, the reporting unit reports the one traveling distance to the passenger without reporting the converted traveling distance, the reporting unit comprises a displaying unit displaying a remaining usage time or a remaining traveling distance required to reach the maintenance period; and the displaying unit performs a renewal of a display of the remaining usage time or the remaining traveling distance when a predetermined amount of time is determined to have passed since the renewal of the display was previously performed, or when the vehicle is determined to have travelled a travelling distance corresponding to the predetermined amount of time according to an estimated value of an annual traveling distance.

2. The maintenance time notification device according to claim 1, wherein the storing unit stores the first threshold value and the second threshold value which are common to all of the vehicle parts.

3. The maintenance time notification device according to claim 1, wherein when the maintenance period determination unit determines that there is no vehicle part with the usage time and the traveling distance that have reached the first threshold value, the reporting unit reports to the passenger, a vehicle part that is closest to a maintenance limit requiring an exchange, and the usage time and the travelling distance of this vehicle part.

4. The maintenance time notification device according to claim 1, wherein the reporting unit comprises a displaying unit displaying a plurality of figures;

the storing unit storing a third threshold value which is set so that the usage time and the traveling distance required to reach the maintenance limit are shorter compared to the first threshold value;

based on a measuring result of the measuring unit, the maintenance period determination unit determines whether or not the usage time and the traveling distance have reached the third threshold value; and when the maintenance period determination unit determines that the usage time and the traveling distance have reached the third threshold value, the displaying unit switches over a displaying condition of a certain figure among the plurality of figures, and reports to the passenger that there is a vehicle part with an impending maintenance limit.

5. The maintenance time notification device according to claim 1, wherein the storing unit stores the vehicle part as a maintenance item corresponding to each of the vehicle part; and the reporting unit comprises a displaying unit displaying the maintenance item, the reporting unit reporting to the passenger by displaying the maintenance item to the displaying unit.

* * * * *